United States Patent [19]

Capitant et al.

[11] Patent Number: 5,283,670
[45] Date of Patent: Feb. 1, 1994

[54] HARDWARE IMPLEMENTATION OF AN HDTV COLOR CORRECTOR

[75] Inventors: Patrice Capitant, Los Altos; Gary M. Bennett, San Jose; Dave Collier, Gilroy; O. F. Morgan; David Rossmere, both of San Jose, all of Calif.

[73] Assignee: Sony Electronics Inc., Park Ridge, N.J.

[21] Appl. No.: 854,367

[22] Filed: Mar. 19, 1992

[51] Int. Cl.$^5$ .................................. H04N 9/64
[52] U.S. Cl. ..................... 358/530; 358/527; 358/518; 382/41; 348/571
[58] Field of Search ......... 358/80, 76, 327, 21, 358/140, 518, 519, 520, 527, 530; 382/41; H04N 9/64

[56] References Cited

U.S. PATENT DOCUMENTS

| | | | |
|---|---|---|---|
| 4,275,413 | 6/1981 | Sakamoto et al. | 358/80 |
| 4,357,624 | 11/1982 | Greenberg | 358/327 |
| 4,860,375 | 8/1989 | McCubbrey | 382/41 |
| 4,866,513 | 9/1989 | Takahashi | 358/76 |
| 4,941,039 | 7/1990 | D'Errico | 358/80 |
| 4,972,257 | 11/1990 | Birnbaum et al. | 358/80 |
| 5,073,818 | 12/1991 | Iida | 358/80 |
| 5,185,666 | 2/1993 | Capitant et al. | 358/76 |
| 5,210,600 | 5/1993 | Hirata | 358/76 |

Primary Examiner—Joseph Mancuso
Assistant Examiner—Steven P. Klocinski
Attorney, Agent, or Firm—Blakely Sokoloff Taylor & Zafman

[57] ABSTRACT

A hardware implementation of a digitized image corrector is disclosed that converts a colorimetric representation of an original image into a new representation based upon the colors of the original and target images, as well as user supplied artistic parameters. The digitized image corrector receives digitized Red, Green and Blue input signals that comprise a colorimetric representation of an original film scene, and generates digitized Red, Green, and Blue output signals according to the specifications of SMPTE 240 M. The digitized image corrector is comprised of four identical hardware correction modules, which are coupled to receive correction parameters from an external source. Each module has a bypass switch for entering a bypass mode, which is used for reconfiguration of the module's correction parameters without affecting the output image. Each correction module receives digitized input signals and generates digitized output signals by transforming the digitized input signals according to a set of predetermined correction parameters and a transfer function defined by a matrix of functions.

14 Claims, 7 Drawing Sheets

HARDWARE IMPLEMENTATION OF AN HDTV COLOR CORRECTOR

BACKGROUND OF THE INVENTION

1. Field of the Invention

The present invention relates to the field of digital image processing systems. More particularly, the present invention relates to hardware implementation of digitized image signal correctors to achieve specified output targets.

2. Art Background

In image processing, image signals typically undergo various adjustments and corrections. For example, in film to video conversion for high definition television (HDTV) these adjustments and corrections may include: a) correction of color distortions due to film dye crosstalk; b) correction of the non-linear luminance transfer function of the film; c) correction for distortion due to video crosstalk; and d) conversion of linear data into SMPTE 240M representation, a predistortion of the data based upon the display gamma.

Additionally, in the film to video conversion for HDTV, an operator may want to: a) adjust the color of a film derived image to match that of a video derived image for seamless intercuts; b) remove localized noise; and/or c) process layered film mattes for smooth composition.

As will be disclosed, the present invention provides a hardware implementation for digitized image signal correctors of an image processing system that allows an operator to dynamically change processing parameters, which enables these correctors to achieve specified output results.

SUMMARY OF THE INVENTION

A hardware implementation of a digitized image corrector is disclosed that converts a colorimetric representation of an original image into a new representation based upon data from the original and target images, as well as user supplied artistic parameters. The present invention allows dynamic modification of processing parameters to convert colorimetry of a film image into that of HDTV.

The digitized image corrector of the present invention is coupled to receive digitized Red, Green and Blue input signals that comprise a colorimetric representation of an original film scene. The digitized image corrector generates digitized Red, Green, and Blue output signals according to the specifications of Society of Motion Picture and Television Engineers (SMPTE) 240M.

The digitized image corrector is comprised of four hardware correction modules, which are coupled to receive correction parameters from an external source, such as an operator input subsystem. The four correction modules are chained together in a serial fashion. Each module has a bypass switch which allows a user to switch any module into a bypass mode such that the module's input is coupled directly to the module's output. At any one moment, one pair of correction modules are switched in a live data path. While a pair of modules are in the live data path, the other pair are in bypass mode. While in bypass mode, an operator can reconfigure the modules' correction parameters without affecting the output image. After new parameters have been loaded into the bypassed modules, the user switches the bypassed pair into the live data path and the live modules into bypass mode, thereby inserting a new set of parameters into the live data path.

Each correction module receives digitized input signals $R_{in}$, $G_{in}$, $B_{in}$, and generates digitized output signals $R_{out}$, $G_{out}$, and $B_{out}$ by transforming digitized input signals $R_{in}$, $G_{in}$, $B_{in}$ according to a set of predetermined correction parameters that are received from the operator input subsystem controlled by the user. In general, a correction module performs a transformation of digitized input signals $R_{in}$, $G_{in}$, $B_{in}$ in accordance with the following arithmetic.

$$R_{out} = f_0 [f_3 (R_{in}) + f_4 (G_{in}) + f_5 (B_{in})]$$

$$G_{out} = f_1 [f_6 (R_{in}) + f_7 (G_{in}) + f_8 (B_{in})]$$

$$B_{out} = f_2 [f_9 (R_{in}) + f_{10} (G_{in}) + f_{11} (B_{in})]$$

Functions $f_0$ through $f_{11}$ comprise a set of predetermined correction parameters supplied by the operator input subsystem and dynamically loaded into the correction module.

The digitized image corrector generates $R_{out}$, $G_{out}$, and $B_{out}$ by transforming input signals $R_{in}$, $G_{in}$, $B_{in}$, based upon the predetermined user supplied parameters received from the operator input subsystem. In the current embodiment of the present invention, the user supplied parameters generate digitized HDTV signals conforming to SMPTE 240M for coupling to an HDTV monitor or image storage device, in order to render a high quality HDTV video image from an original film image.

DETAILED DESCRIPTION OF THE INVENTION

A hardware implementation of a digitized image corrector is disclosed that converts a colorimetric representation of an original image into a new representation based upon data from the original and target images, as well as user supplied artistic parameters. In the following description, for purposes of explanation, specific circuit devices, circuit architectures, and components are set forth in order to provide a more thorough understanding of the present invention. However, it will be apparent to one skilled in the art that the present invention may be practiced without these specific details. In other instances, well known circuits and devices are shown in schematic form in order not to obscure the present invention unnecessarily.

The present invention is a hardware implementation of a digitized image corrector that allows dynamic modification of correction parameters to achieve desired output specifications and artistic correction. The current embodiment of the present invention converts colorimetry of what was an image on film into HDTV. Additionally, the digitized image corrector of the present invention can solve a wide variety of data processing and image processing problems, as will be described.

Figure 1:
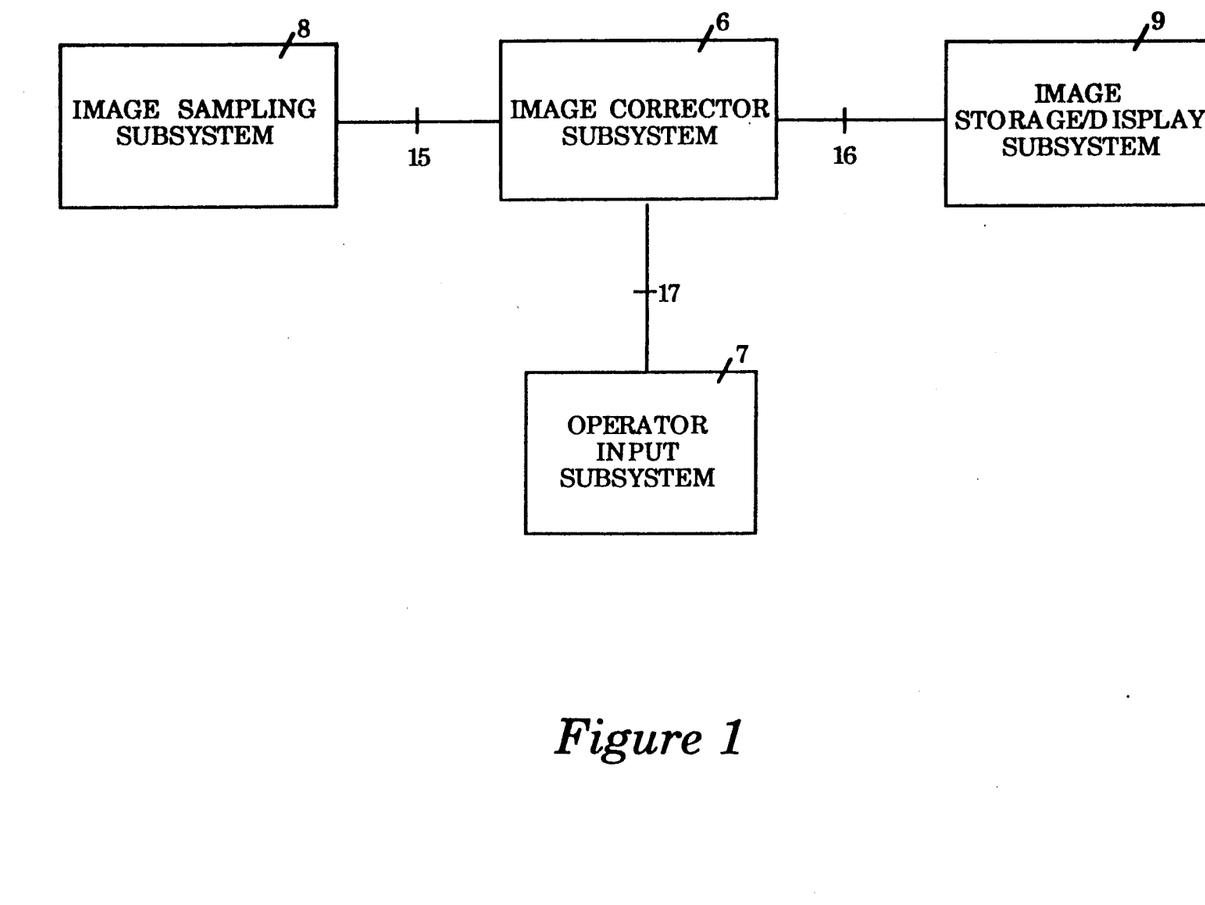
FIG. 1 is an overall block diagram of digital image processing system that incorporates the teachings of the present invention.

Referring to FIG. 1, a block diagram of a digital image processing system that incorporates the teachings of the present invention is illustrated. Image corrector subsystem 6 receives digitized input signals 15 from image sampling subsystem 8. Image corrector subsystem 6 also receives predefined correction parameters 17 from operator input subsystem 7. Image corrector subsystem 6 generates digitized output signals 16 which are coupled to image storage/display subsystem 9.

Image sampling subsystem 8 is used for sampling physical images to generate digitized spatial samples for the images. In the current embodiment, image sampling subsystem 8 generates digitized Red, Green, and Blue video signals representing an original image on film.

Image storage/display subsystem 9 receives digitized output signals 16 and stores and/or generates the output images defined by output signals 16. Image storage/display subsystem 9 is intended to represent a broad category of image storage and display devices, including HDTV monitors, video recording devices, laser disc devices and frame buffer storage mechanisms. In the current embodiment, image storage/display subsystem 9 represents devices that store and display images based on SMPTE 240M.

Image corrector subsystem 6 interacts with a user through operator input subsystem 7. The user inputs commands into operator input subsystem 7 to generate correction parameters 17 for image corrector subsystem 6. The user may also input commands to retrieve correction parameters from image corrector subsystem 6. Image corrector subsystem 6 receives digitized input signals 15 and generates digitized output signals 16 based upon user defined correction parameters 17 received from operator input subsystem 7. In the current embodiment, the user defined parameters are used to convert digitized input signals 15 into digitized HDTV signals conforming to SMPTE 240M. Image corrector subsystem 6 will be described in further detail below with reference to FIG. 2.

The correction processes required when converting an original film image into an HDTV image include correction for colorimetric distortion due to film dye crosstalk, correction for the non-linear luminance transfer functions of the film, correction for distortion caused by video crosstalk, and conversion of the linear data into an SMPTE 240M representation by predistorting the data based upon the display gamma. In addition, for artistic correction a user may desire to change parameters based upon the quality of the visual image. The original correction parameters depend on the type of film used, and the final colorimetry is based upon the specifications of SMPTE 240M. For a detailed discussion of the correction parameters involved in converting film into HDTV format see application Ser. No. 07/864,675, filed on Mar. 5, 1992, entitled Automatic Determination of Video System Processing Parameters From Specified System Response.

Figure 2:
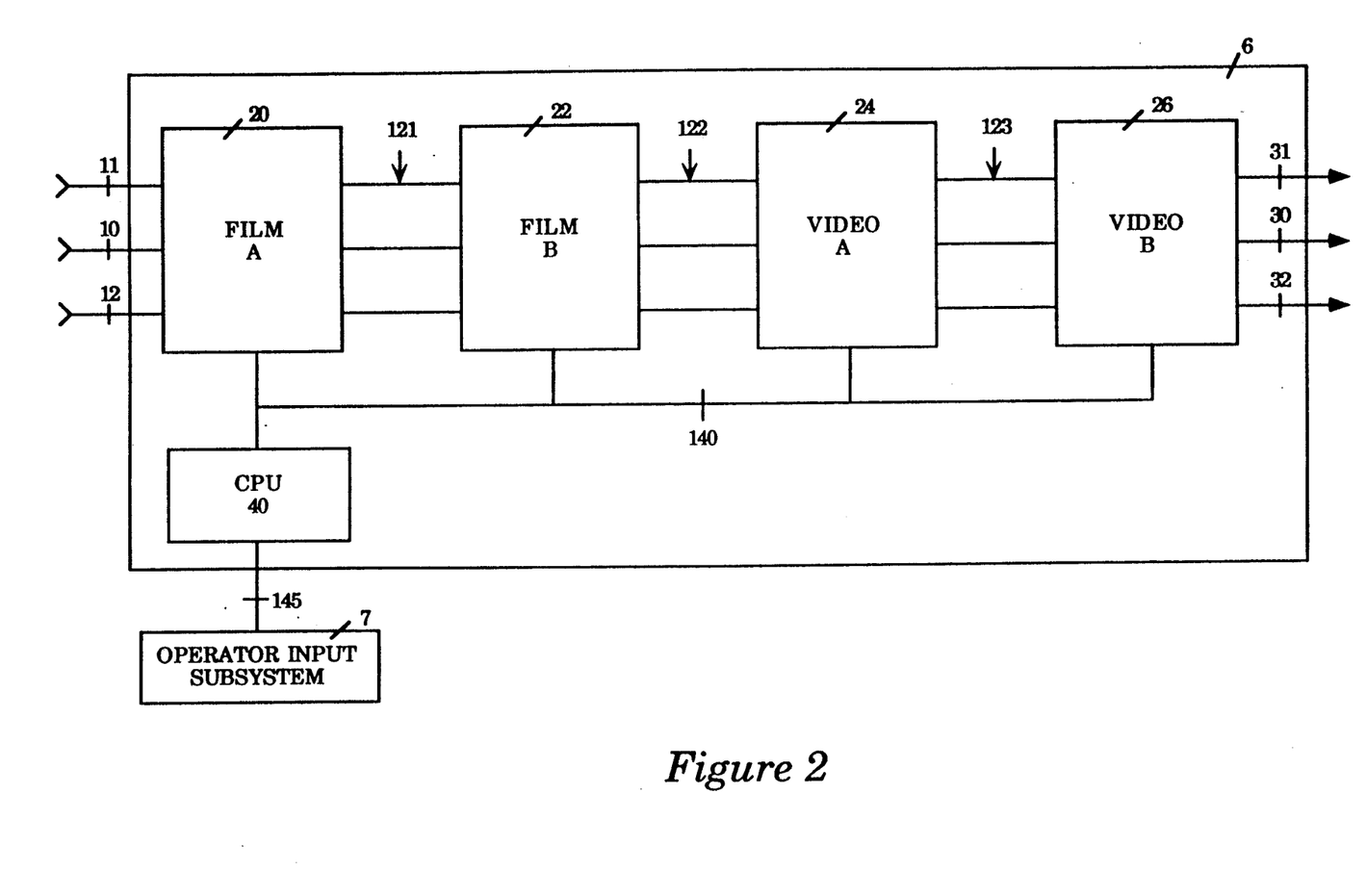
FIG. 2 is a block diagram of the digitized image corrector of the present invention, including four correction modules.

FIG. 2 provides a block diagram of image corrector subsystem 6. The digitized image corrector of the present invention is comprised of four identical hardware correction modules: film A module 20, film B module 22, video A module 24, video B module 26. Modules 20, 22, 24 and 26 are coupled to receive correction parameters from CPU 40 over bus 140. The correction parameters are calculated by operator input subsystem 7 and downloaded to CPU 40 over bus 145. The digitized image corrector receives digitized input signals 15, in the current embodiment preferably comprising digitized Red 10, digitized Green 11, and digitized Blue 12 color signals representing the original film scene. The digitized image corrector generates digitized output signals 16, in the current embodiment preferably comprising digitized Red 30, digitized Green 31, and digitized Blue 32 color signals representing the original film scene.

The four correction modules, film A 20, film B 22, video A 24, and video B 26 are chained together in a serial fashion so that the output of module 20 is coupled to the input of module 22, the output of module 22 is coupled to the input of module 24, and the output of module 24 is coupled to the input of module 26. Each module has a bypass switch controlled by CPU 40. This allows CPU 40 to switch any module into a bypass mode such that the input of a module is coupled directly to the module's output. When a module is not in bypass mode, it is in a live data mode wherein a transformation is performed on an input signal received by the module.

During normal operation, a live data path comprises a series of digitized image signals received on signal lines 10–12, coupled to flow in series through signal lines 121, 122, and 123, and transmitted over signal lines 30–32. When a module is in bypass mode, it is removed from the live data path since its input is directly coupled to its output. At any one moment, in the current embodiment, either film A 20 and video A 24 video B 26 are switched in the live data path. While film A 20 and video A 24 are in the live data path, film B 22 and video B 26 are in bypass mode. Conversely, while film B 22 and video B 26 are in the live data path, film A 20 and video A 24 are in bypass mode.

While a pair of modules, film A 20 and video A 24, or film B 22 and video B 26, are in bypass mode, CPU 40 can reconfigure the module's correction parameters without affecting the digitized output signals 30–32 After new parameters have been loaded into the bypassed modules over bus 140, CPU 40 switches the bypassed pair into the live data mode and the live modules into bypass mode, thereby inserting a new set of parameters into the live data path. Moreover, during bypass mode, CPU 40 can read correction parameters from a module over bus 140.

Film A module 20 generates digitized signals 121 by transforming Red 10, Green 11, and Blue 12 according to correction parameters preloaded into Film A module 20 by CPU 40. Similarly, film B module 22 transforms digitized signals 121 into digitized signals 122 according to correction parameters preloaded into Film B module 22 by CPU 40. Likewise, Video A module 24 transforms digitized signals 122 into digitized signals 123, and Video B module 26 transforms digitized signals 123 into digitized signal 30–32. As noted above, any one of modules 20, 22, 24, and 26 can be switched into a bypass mode wherein the module does not perform a transformation.

With the modular approach illustrated in FIG. 2, it is possible to couple together as many hardware correction modules as required to meet the input/output specifications of the system. To perform the required image corrections to meet the system specifications, each hardware correction module 20, 22, 24, and 26 is loaded with a unique set of correction parameters set by CPU 40. These correction parameters are calculated by operator input subsystem 7 and down-loaded to CPU 40 over bus 145.

In the current embodiment of the present invention, the hardware correction module parameters are generated by operator input subsystem 7 in order to convert digitized Red 10, digitized Green 11, and digitized Blue 12 color signals representing the original film scene into digitized output Red 30, Green 31, and Blue 32 according to the specifications of SMPTE 240M. As their name suggests, film A module 20 and film B module 22 are used to perform film related corrections, and video A module 24 and video B module 26 are used to perform HDTV video related corrections. For a discussion of how these correction parameters are generated, see application Ser. No. 07/864,675, filed on Mar. 5, 1992, entitled Automatic Determination of Video System Processing Parameters From Specified System Response.

Figure 3:
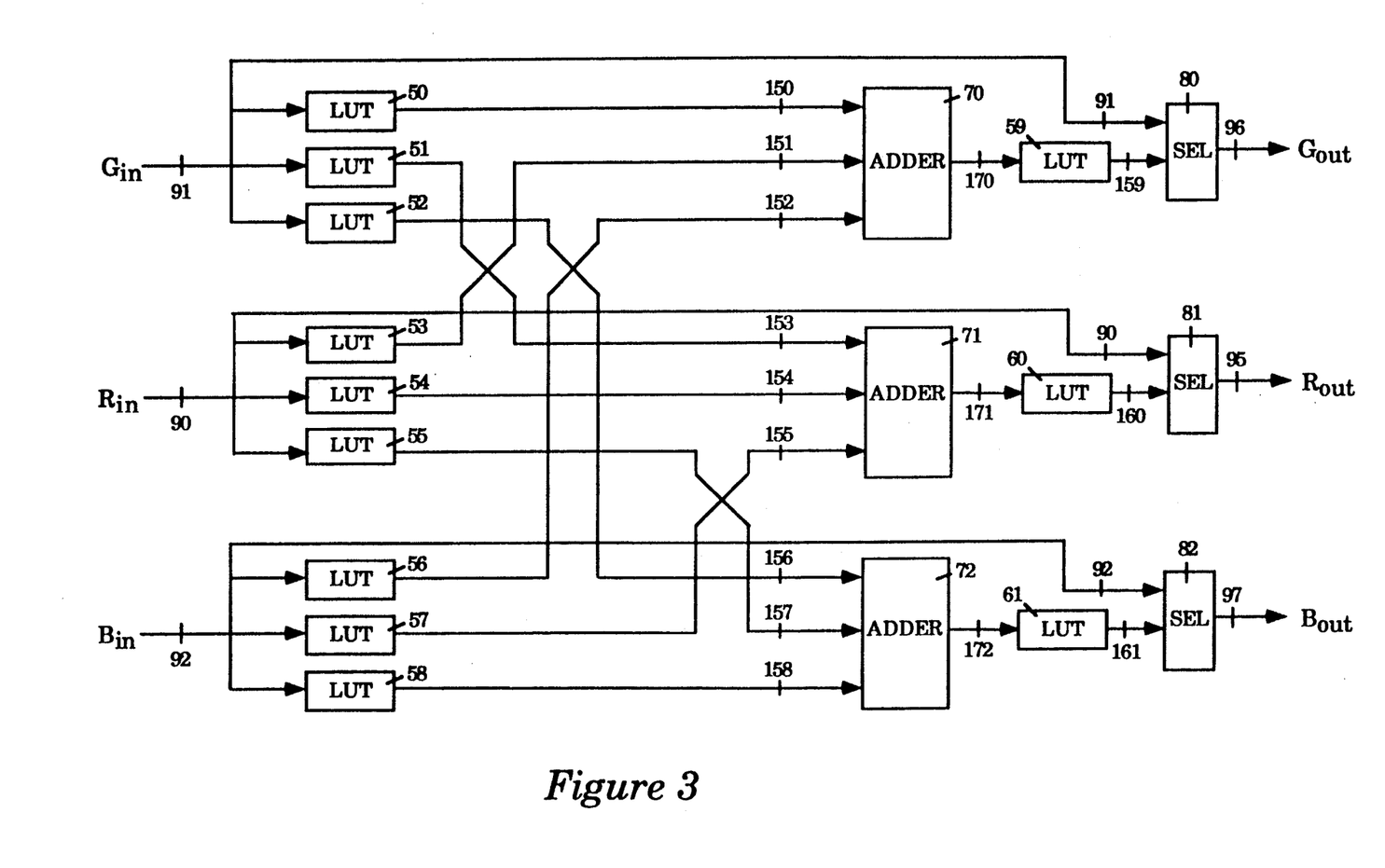
FIG. 3 is a block diagram of an individual correction module illustrating the LUT circuits and adder circuits used to transform the digitized input signals according to the predetermined correction parameters.

FIG. 3 provides a block diagram of an individual hardware correction module of the present invention, such as module 20, 22, 24, or 26. A correction module receives digitized input signals $R_{in}$, $G_{in}$, $B_{in}$ on signal lines 90, 91 and 92, respectively, and generates digitized output signals $R_{out}$, $G_{out}$, and $B_{out}$ on signal lines 95, 96, and 97, respectively. A correction module generates digitized output signals $R_{out}$, $G_{out}$, and $B_{out}$ by transforming digitized input signals $R_{in}$, $G_{in}$, $B_{in}$ according to a set of predetermined correction parameters that are received from CPU 40 over bus 140. The predetermined parameters are loaded into LUT circuits 50–61 while the module is in bypass mode. Thereafter, CPU 40 switches the module into live mode to perform the transformation.

In the current embodiment of the present invention, the correction module of FIG. 3 performs a transformation of digitized input signals $R_{in}$, $G_{in}$, $B_{in}$ in accordance with the following arithmetic.

$$R_{out} = f_0 [f_3 (R_{in}) + f_4 (G_{in}) + f_5 (B_{in})] \qquad \text{Eq. 1}$$

$$G_{out} = f_1 [f_6 (R_{in}) + f_7 (G_{in}) + f_8 (B_{in})] \qquad \text{Eq. 2}$$

$$B_{out} = f_2 [f_9 (R_{in}) + f_{10} (G_{in}) + f_{11} (B_{in})] \qquad \text{Eq. 3}$$

where, $f_0, f_1, f_2$ = non linear transfer functions
$f_3$ = crosstalk component of Red in Red
$f_4$ = crosstalk component of Green in Red
$f_5$ = crosstalk component of Blue in Red
$f_6$ = crosstalk component of Red in Green
$f_7$ = crosstalk component of Green in Green
$f_8$ = crosstalk component of Blue in Green
$f_9$ = crosstalk component of Red in Blue
$f_{10}$ = crosstalk component of Green in Blue
$f_{11}$ = crosstalk component of Blue in Blue Functions $f_0$ through $f_{11}$ comprise a set of predetermined correction parameters supplied by operator input subsystem 7. In the correction module of FIG. 3, functions $f_0$ through $f_{11}$ are implemented using lookup table (LUT) circuits 50–61, which are preloaded with transform data needed to perform functions $f_0$ through $f_{11}$.

Each LUT circuit 50–61 enables CPU 40 to load any predetermined function over bus 140. Each LUT circuit 50–61 has a programmable data path controlled by CPU 40, and an auto increment subcircuit that allows CPU 40 to quickly load transform data to perform the desired function or functions. CPU 40 may also read transform data stored in LUT circuits 50–61. Each LUT 50–61 is comprised of at least four banks of transform data, which allows CPU 40 to preload transform data for four different functions into each LUT circuit 50–61. Thereafter, CPU 40 can modify the function being performed by each LUT circuit 50–61, in real time, by switching banks of individual LUT circuits 50–61. The ability to switch functions in real time is useful for implementing moving mattes, doing localized color correction, doing A/B comparisons between various curves, and for doing colorimetry changes in real time at a scene change. For a more detailed discussion of the function of LUT circuits 50–61, refer to Ser. No. 07/826,094, filed on Jan. 27, 1992, entitled Flexible Computer Controlled Non-Linear Transform Generator.

Adder circuits 70, 71 and 72 are very fast synchronous clipping circuits capable of adding three 20 bit values in 54 nano-seconds. The inputs are formatted as signed values with three significant digits and 16 fractional bits. The output of each adder 70, 71, and 72 is a 16 bit unsigned quantity with two significant digits and 14 fractional bits. Since the sum could be acceptable, negative, or overflow the legal two significant bits, the circuit has provisions to clip the output value to all zeros or all ones, as required. For a more detailed discussion of adder circuits 70, 71, and 72 refer to U.S. Pat. No. 5,210,711, filed on Feb. 26, 1992, entitled A Very Fast Variable Input Multi-Bit Adder.

In the current embodiment of the present invention, functions $f_0$, $f_1$, and $f_2$ have 16 bit inputs and a 16 bit outputs. Functions $f_3,-f_{11}$ have 16 bit inputs and 20 bit outputs. A critical element of system performance is the precision used in implementing LUT circuits 50–61 and adder circuits 70–72. The bit widths used were chosen to result in a final error of no more than one LSB (less than 0.1%).

To perform digitized image correction, CPU 40 preloads LUT circuit 50 with transform data necessary to implement function $f_7$. Similarly, CPU 40 preloads LUT circuit 51 with transform data to implement function $f_4$ and LUT circuit 52 with transform data to implement function $f_{10}$. In a similar manner, CPU 40 preloads LUT circuits 53, 54, and 55 with transform data to implement functions $f_6$, $f_3$, and $f_9$, respectively. Likewise, CPU 40 loads LUT circuits 56, 57 and 58 with transform data to implement functions $f_8$, $f_5$, and $f_{11}$, respectively. LUT circuits 50, 51, and 52 are coupled to receive $G_{in}$ 91, LUT circuits 53, 54, and 55 are coupled to receive $R_{in}$ 90, and LUT circuits 56, 57 and 58 are coupled to receive $B_{in}$ 92.

During live data transformation, LUT circuit 50 generates a digitized signal equal to $f_7 (G_{in})$. Likewise, LUT circuit 51 generates $f_4 (G_{in})$, and LUT circuit 52 generates $f_{10} (G_{in})$. In a similar manner, LUT circuits 53, 54, and 55 generate $f_6(R_{in})$, $f_3(R_{in})$, and $f_9(R_{in})$, respectively. LUT circuits 56, 57 and 58 generate $f_8 (B_{in})$, $f_5 (B_{in})$, and $f_{11} (B_{in})$, respectively.

By examining FIG. 3, it will be appreciated that input 150 of adder circuit 70 equals $f_7 (G_{in})$. Moreover, input 151 of adder circuit 70 equals $f_6(R_{in})$, and input 152 of adder circuit 70 equals $f_8 (B_{in})$. As a consequence, output 170 of adder circuit 70 equals the arithmetic sum of the foregoing terms, or $f_6(R_{in}) + f_6(B_{in}) + f_8(B_{in})$. LUT circuit 59 is preloaded by CPU 40 with transform data to implement function $f_1$. Therefore, digitized signal 159 equals $f_1 [f_6 (R_{in}) + f_7 (G_{in}) + f_8 (B_{in})]$ as given by Eq. 2 above. Selector 80 multiplexes digitized signal 159 and $G_{in}$ 91 to $G_{out}$ 96 under control of CPU 40.

Similarly, it will be appreciated that input 153 of adder circuit 71 equals $f_4 (G_{in})$, input 154 of adder circuit 71 equals $f_3(R_{in})$, and input 155 of adder circuit 71 equals $f_5 (B_{in})$. Thus, output 171 of adder circuit 71 equals the arithmetic sum of the foregoing terms, or $f_3 (R_{in}) + f_4 (G_{in}) + f_5 (B_{in})$. LUT circuit 60 is preloaded by CPU 40 with transform data to implement function $f_0$. Therefore, digitized signal 160 equals $f_0 [f_3 (R_{in}) + f_4 (G_{in}) + f_5 (B_{in})]$ as given by Eq. 1 above. Selector 81 multiplexes digitized signal 160 and $R_{in}$ 90 to $R_{out}$ 95 under control of CPU 40.

Finally, input 156 of adder circuit 72 equals $f_{10}(G_{in})$, input 157 of adder circuit 72 equals $f_9(R_{in})$, and input 158 of adder circuit 72 equals $f_{11}(B_{in})$. Thus, output 172 of adder circuit 72 equals $f_9 (R_{in}) + f_{10} (G_{in}) + f_{11} (B_{in})$. LUT circuit 60 is preloaded by CPU 40 with transform data to implement function $f_2$. Therefore, digitized signal 161 equals $f_2 [f_9 (R_{in}) + f_{10} (G_{in}) + f_{11} (B_{in})]$ as given by Eq. 3 above. Selector 82 multiplexes digitized signal 161 and $B_{in}$ 92 to $B_{out}$ 97 under control of CPU 40.

Figure 4A:
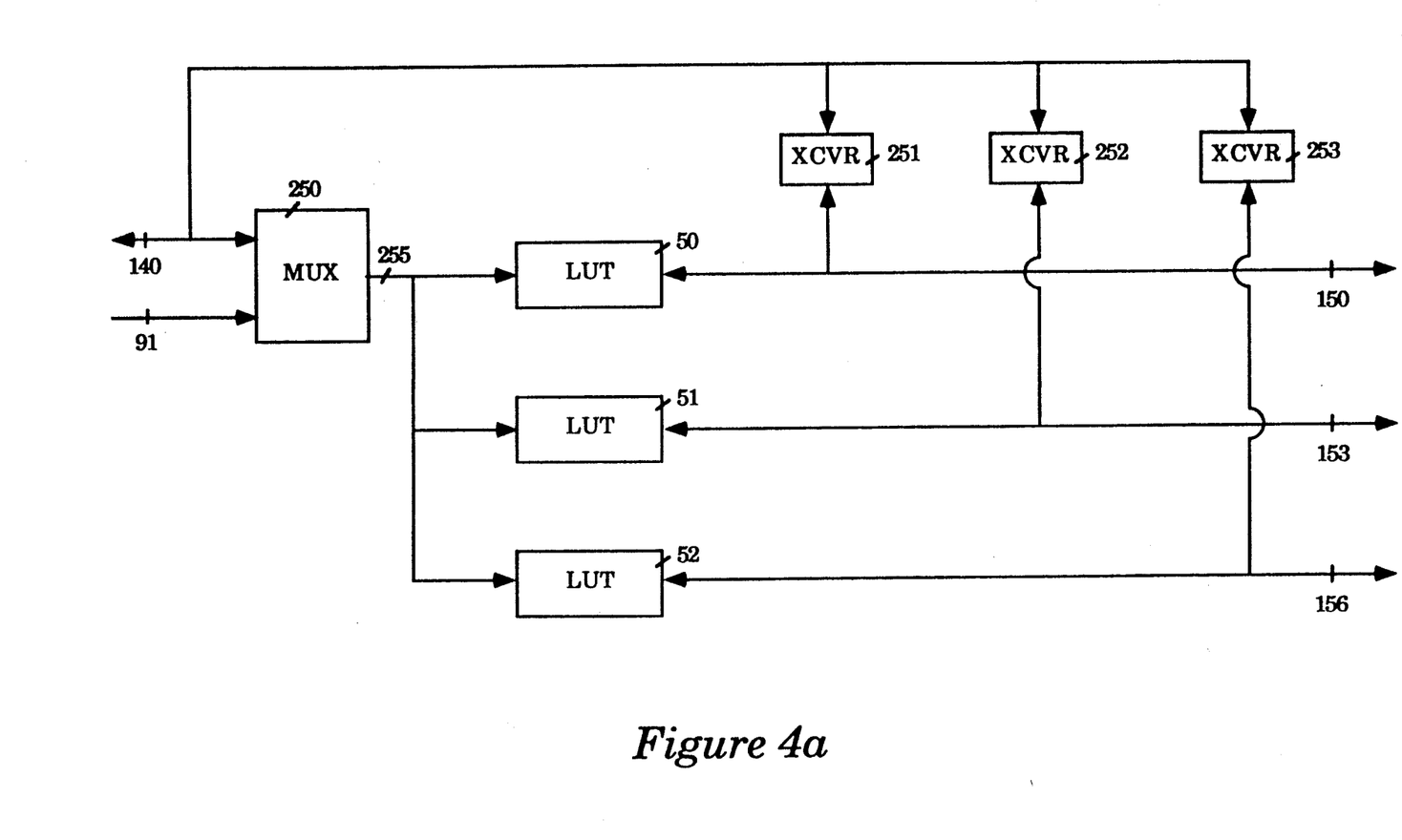
FIGS. 4a–4d provide a more detailed illustration of an individual correction module, including means for reading and writing transform data stored in the LUT circuits, and means for bypassing the correction module.

FIGS. 4a-4d provide a more detailed block diagram of a correction module. FIG. 4a illustrates the circuitry used to load transform data into LUT circuits 50-52. Multiplexer circuit 250 is coupled to receive $G_{in}$ 91 and CPU address signals over bus 140. During bypass mode, multiplexer circuit 250 transmits CPU address signals from bus 140 to LUT circuits 50-52 over signal lines 255 in order to load transform data. Transform data from CPU 40 is received by transceiver circuits 251, 252, and 253 over bus 140. Transceiver circuit 251 is coupled to transmit and receive transform data to and from LUT circuit 50. Similarly, transceiver circuit 252 is coupled to transmit and receive transform data to and from LUT circuit 51, and transceiver circuit 253 is coupled to transmit and receive transform data to and from LUT circuit 53. During live data mode, multiplexer circuit 250 transmits $G_{in}$ 91 to LUT circuits 50-52 over signal lines 255 in order to transform $G_{in}$.

Figure 4B:
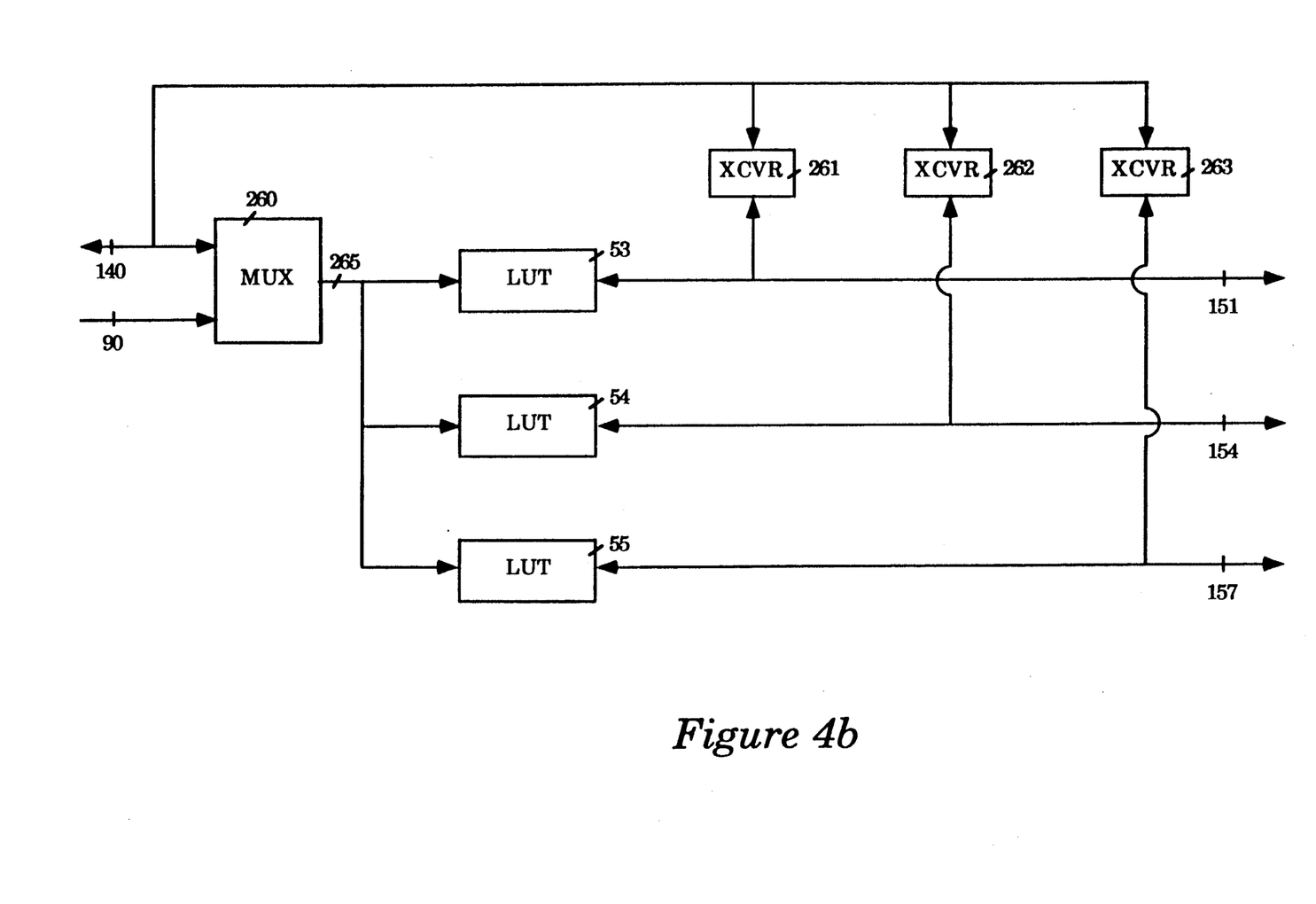

FIG. 4b illustrates the circuitry used to load transform data into LUT circuits 53-55. Multiplexer circuit 260 is coupled to receive $R_{in}$ 90 and CPU address signals over bus 140. Multiplexer circuit 260 transmits CPU address signals from bus 140 to LUT circuits 53-55 over signal lines 265 in order to load transform data during bypass mode. Transform data is received by transceiver circuits 261, 262, and 263 over bus 140. Transceiver circuit 261 is coupled to transfer transform data to and from LUT circuit 53, transceiver circuit 262 is coupled to transfer transform data to and from LUT circuit 54, and transceiver circuit 263 is coupled to transfer transform data to and from LUT circuit 55. Multiplexer circuit 260 transmits $R_{in}$ 90 to LUT circuits 53-55 over signal lines 265 in order to transform $R_{in}$ during the live data mode.

Figure 4C:
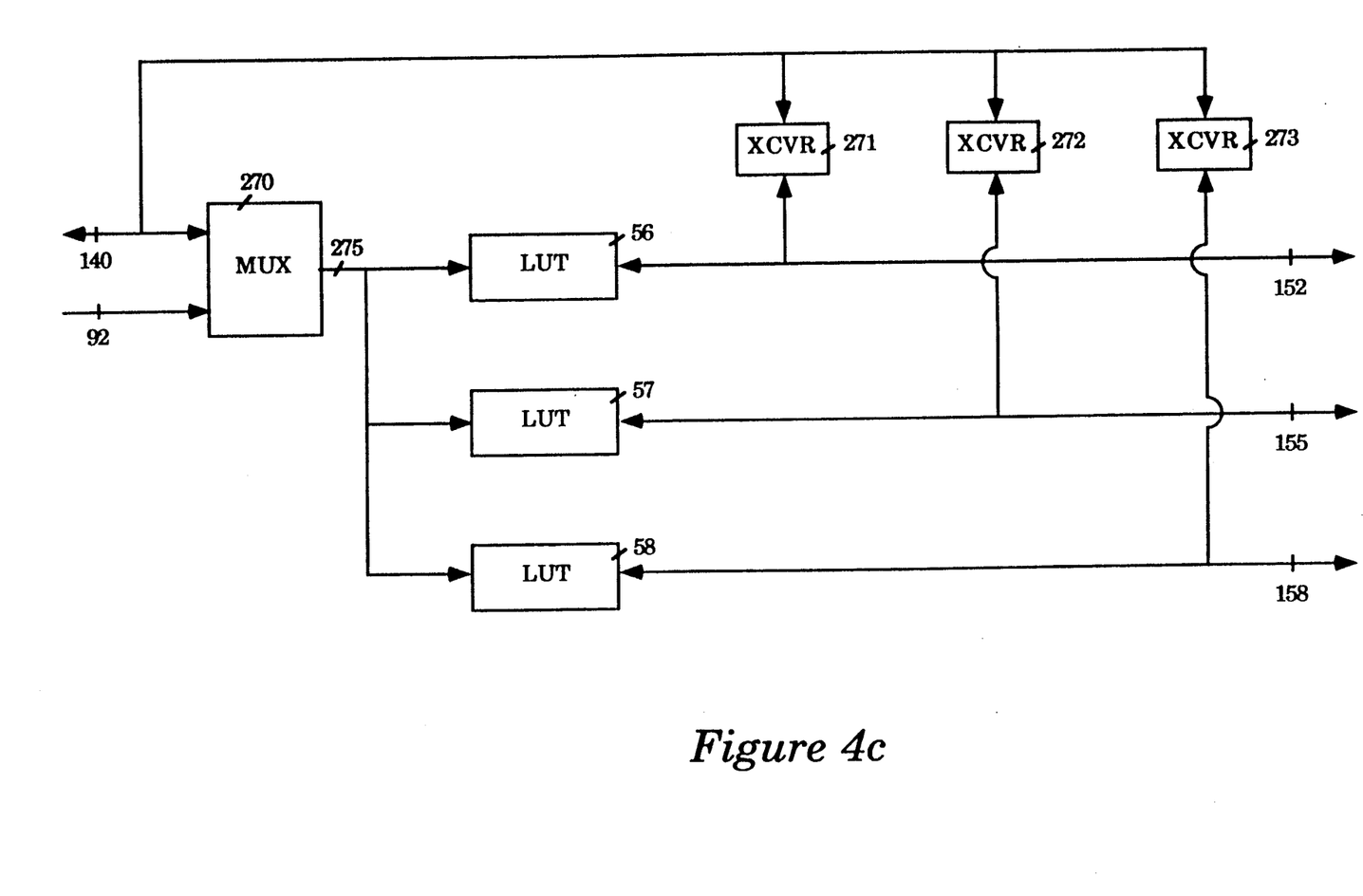

FIG. 4c illustrates the circuitry used to load transform data into LUT circuits 56-58. Multiplexer circuit 270 is coupled to receive $B_{in}$ 92 and CPU address signals over bus 140, and to transmit CPU address signals from bus 140 to LUT circuits 56-58 over signal lines 275 in order to load transform data during bypass mode. Transform data is received by transceiver circuits 271, 272, and 273 over bus 140. Transceiver circuit 271 is coupled to transfer transform data to and from LUT circuit 56, transceiver circuit 272 is coupled to transfer transform data to and from LUT circuit 57, and transceiver circuit 273 is coupled to transfer transform data to and from LUT circuit 58. Multiplexer circuit 270 transmits $B_{in}$ 92 to LUT circuits 56-58 over signal lines 275 in order to transform $B_{in}$ during the live data mode.

Figure 4D:
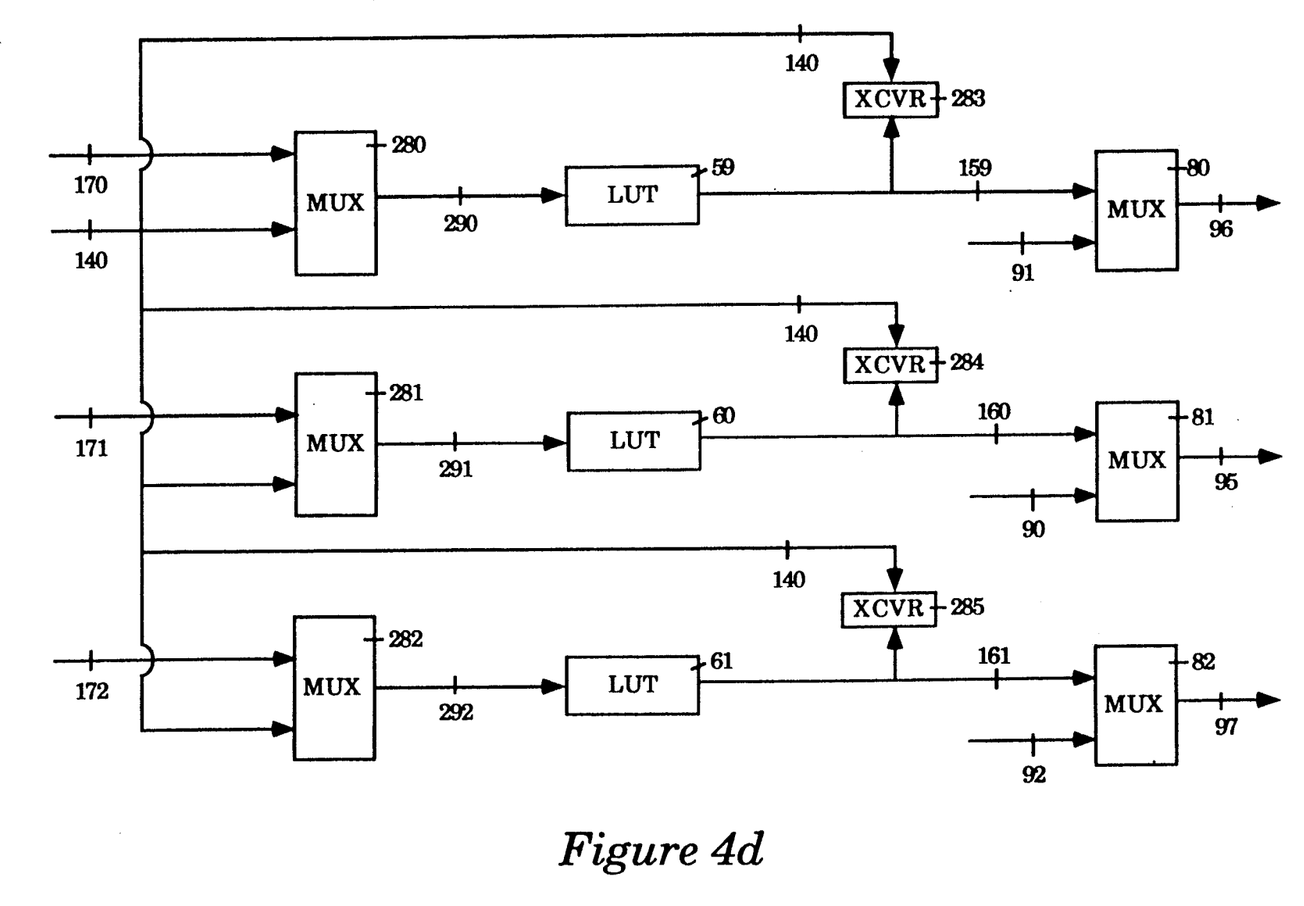

FIG. 4d illustrates circuitry used to load LUT circuits 59-61, and circuitry used to switch between bypass mode and live data mode under control of CPU 40. Multiplex circuits 280, 281, and 282 are coupled to receive address signals from CPU 40 over bus 140. Transceiver circuits 283, 284, and 285 are coupled to transfer data between CPU 40 and LUT circuits 58, 60, and 61, respectively. Transform data is received by transceiver circuits 283, 284, and 285 over bus 140. Transceiver circuit 283 is coupled to transfer transform data to and from LUT circuit 59, transceiver circuit 284 is coupled to transfer transform data to and from LUT circuit 60, and transceiver circuit 285 is coupled to transfer transform data to and from LUT circuit 61.

Digitized signal 159, defined by Eq. 2 during live data transformation, and $G_{in}$ 91 are multiplexed to $G_{out}$ 96 by multiplexer 80 under control of CPU 40. Similarly, digitized signal 160, defined by Eq. 1 during live data transformation, and $R_{in}$ 90 are multiplexed to $R_{out}$ 95 by multiplexer 81 under control of CPU 40, and digitized signal 161, defined by Eq. 3 during live data transformation, and $B_{in}$ 92 are multiplexed to $B_{out}$ 97 by multiplexer 82 under control of CPU 40. Thus, when CPU 40 switches the correction module into bypass mode, $R_{out} = R_{in}$, $G_{out} = G_{in}$, and $B_{out} = B_{in}$.

An alternative embodiment of the present invention may be employed to provide color space conversion. As discussed above, $$R_{out} = f_0 [f_3 (R_{in}) + f_4 (G_{in}) + f_5 (B_{in})]$$

$$G_{out} = f_1 [f_6 (R_{in}) + f_7 (G_{in}) + f_8 (B_{in})]$$

$$B_{out} = f_2 [f_9 (R_{in}) + f_{10} (G_{in}) + f_{11} (B_{in})].$$

If $f_0$, $f_1$, and $f_2$ are each set to one, then $f_3$ through $f_{11}$ can be set to convert the input signal into a new color space. Examples are RGB video to YUV video, or HIS to YIQ. This has wide application in computer graphics and video.

Alternatively, if $f_5$, $f_7$, and $f_9$ are each set to zero, and $f_3$, $f_4$, $f_6$, $f_8$, $f_{10}$, and $f_{11}$ are the log function, and $f_0$, $f_1$, and $f_2$ are the exponential function, then the correction module implements the following functions:

$$R_{out} = \exp [\log (R_{in}) + \log (G_{in})]$$

$$G_{out} = \exp [\log (R_{in}) + \log (B_{in})]$$

$$B_{out} = \exp [\log (G_{in}) + \log (B_{in})].$$

Since addition in the log domain is equivalent to multiplication in the linear domain, the correction module becomes a multiplier. Thus, an alternative embodiment of the present invention provides one module which removes an offset by being configured for subtraction and a second module that multiplies by a gain by being configured for multiplication.

The present invention has application for use in image processing environments and may be incorporated into a variety of data processing circuitry. Although the present invention has been described in conjunction with the embodiments illustrated in FIGS. 1 through 4, it is evident that numerous alternatives, modifications, variations and uses will be apparent to those skilled in the art in light of the foregoing description.

What is claimed is:

1. A digitized image corrector for transforming a first digitized representation of an image into a second digitized representation of said image in accordance with a first transformation function defined by a first set of transform data, a second transformation function defined by a second set of transform data, a third transformation function defined by a third set of transform data, and a fourth transformation function defined by a fourth set of transform data, comprising:

first correction circuit for receiving said first set of transform data from a user and transforming said first digitized representation in accordance with said first transformation function, said first correction circuit having a first input means for receiving a first digitized signal, a second digitized signal, and a third digitized signal comprising said first digitized representation, said first correction circuit generating a first transformed signal, a second transformed signal, and a third transformed signal according to said first transformation function, said first correction circuit having a first output means for transmitting said first transformed signal, said second transformed signal, and said third transformed signal;

first bypass means for selectively bypassing said first correction circuit such that said first output means is coupled to transmit said first digitized signal, said second digitized signal, and said third digitized signal;

second correction circuit for receiving said second set of transform data from said user and transforming said first transformed signal, said second transformed signal, and said third transformed signal in accordance with said second transformation function, said second correction circuit having a second input means for receiving said first transformed signal, said second transformed signal, and said third transformed signal from said first output means, said second correction circuit generating a fourth transformed signal, a fifth transformed signal, and a sixth transformed signal according to said second transformation function, said second correction circuit having a second output means for transmitting said fourth transformed signal, said fifth transformed signal, and said sixth transformed signal;

second bypass means for selectively bypassing said second correction circuit such that said second output means is coupled to transmit said first transformed signal, said second transformed signal, and said third transformed signal;

third correction circuit for receiving said third set of transform data from said user and transforming said fourth transformed signal, said fifth transformed signal, and said sixth transformed signal in accordance with said third transformation function, said third correction circuit having a third input means for receiving said fourth transformed signal, said fifth transformed signal, and said sixth transformed signal from said second output means, said third correction circuit generating a seventh transformed signal, an eight transformed signal, and a ninth transformed signal according to said third transformation function, said third correction circuit having a third output means for transmitting said seventh transformed signal, said eight transformed signal, and said ninth transformed signal;

third bypass means for selectively bypassing said third correction circuit such that said third output means is coupled to transmit said fourth transformed signal, said fifth transformed signal, and said sixth transformed signal;

fourth correction circuit for receiving said fourth set of transform data from said user and transforming said seventh transformed signal, said eight transformed signal, and said ninth transformed signal in accordance with said fourth transformation function, said fourth correction circuit having a fourth input means for receiving said seventh transformed signal, said eight transformed signal, and said ninth transformed signal from said third output means, said fourth correction circuit generating a tenth transformed signal, an eleventh transformed signal, and a twelfth transformed signal according to said fourth transformation function, said fourth correction circuit having a fourth output means for transmitting said tenth transformed signal, said eleventh transformed signal, and said twelfth transformed signal comprising said second digitized representation;

fourth bypass means for selectively bypassing said fourth correction circuit such that said fourth output means is coupled to transmit said seventh transformed signal, said eight transformed signal, and said ninth transformed signal;

image storage means for storing said second digitized representation of said image for subsequent display, wherein said first correction circuit comprises;

first function means for performing three transformations on said second digitized signal, said first function means coupled to receive said second digitized signal, said first function means generating a first signal, a second signal and a third signal;

second function means for performing three transformations on said first digitized signal, said second function means coupled to receive said first digitized signal, said second function means generating a fourth signal, a fifth signal and a sixth signal;

third function means for performing three transformations on said third digitized signal, said third function means coupled to receive said third digitized signal, said third function means generating a seventh signal, an eight signal and a ninth signal;

first adder means for generating a first term signal equal to the arithmetic sum of said first signal, said fourth signal, and said seventh signal, said first adder means coupled to receive said first signal, said fourth signal, and said seventh signal;

second adder means for generating a second term signal equal to the arithmetic sum of said second signal, said fifth signal, and said eight signal, said second adder means coupled to receive said second signal, said fifth signal, and said eight signal;

third adder means for generating a third term signal equal to the arithmetic sum of said third signal, said sixth signal, and said ninth signal, said third adder means coupled to receive said third signal, said sixth signal, and said ninth signal;

fourth function means for transforming said first term signal, said fourth function means coupled to receive said first term signal, said fourth function means generating said first transformed signal;

fifth function means for transforming said second term signal, said fifth function means coupled to receive said second term signal, said fifth function means generating said second transformed signal;

sixth function means for transforming said third term signal, said sixth function means coupled to receive said third term signal, said sixth function means generating said third transformed signal.

2. A digitized image corrector transforming a first digitized representation of an image into a second digitized representation of said image in accordance with a first transformation function defined by a first set of transform data, a second transformation function defined by a second set of transform data, a third transformation function defined by a third set of transform data, and a fourth transformation function defined by a fourth set of transform data, comprising:

first correction circuit for receiving said first set of transform data from a user and transforming said first digitized representation in accordance with said first transformation function, said first correction circuit having a first input means for receiving a first digitized signal, a second digitized signal, and a third digitized signal comprising said first digitized representation, said first correction circuit generating a first transformed signal, a second transformed signal, and a third transformed signal according to said first transformation function, said first correction circuit having a first output means for transmitting said first transformed signal, said second transformed signal, and said third transformed signal;

first bypass means for selectively bypassing said first correction circuit such that said first output means is coupled to transmit said first digitized signal, said second digitized signal, and said third digitized signal;

second correction circuit for receiving said second set of transform data from said user and transforming said first transformed signal, said second transformed signal, and said third transformed signal in accordance with said second transformation function, said second correction circuit having a second input means for receiving said first transformed signal, said second transformed signal, and said third transformed signal from said first output means, said second correction circuit generating a fourth transformed signal, a fifth transformed signal, and a sixth transformed signal according to said second transformation function, said second correction circuit having a second output means for transmitting said fourth transformed signal, said fifth transformed signal, and said sixth transformed signal;

second bypass means for selectively bypassing said second correction circuit such that said second output means is coupled to transmit said first transformed signal, said second transformed signal, and said third transformed signal;

third correction circuit for receiving said third set of transform data from said user and transforming said fourth transformed signal, said fifth transformed signal, and said sixth transformed signal in accordance with said third transformation function, said third correction having a third input means for receiving said fourth transformed signal, said fifth transformed signal, and said sixth transformed signal from said second output means, said third correction circuit generating a seventh transformed signal, an eight transformed signal, and a ninth transformed signal according to said third transformation function, said third correction circuit having a third output means for transmitting said seventh transformed signal, said eight transformed signal, and said ninth transformed signal;

third bypass means for selectively bypassing said third correction circuit such that said third output means is coupled to transmit said fourth transformed signal, said fifth transformed signal, and said sixth transformed signal;

fourth correction circuit for receiving said fourth set of transform data from said user and transforming said seventh transformed signal, said eight transformed signal, and said ninth transformed signal in accordance with said fourth transformation function, said fourth correction circuit having a fourth input means for receiving said seventh transformed signal, said eight transformed signal, and said ninth transformed signal from said third output means, said fourth correction circuit generating a tenth transformed signal, an eleventh transformed signal, and a twelfth transformed signal according to said fourth transformation function, said fourth correction circuit having a fourth output means for transmitting said tenth transformed signal, said eleventh transformed signal, and said twelfth transformed signal comprising said second digitized representation;

fourth bypass means for selectively bypassing said fourth correction circuit such that said fourth output means is coupled to transmit said seventh transformed signal, said eight transformed signal, and said ninth transformed signal;

image storage means for storing said second digitized representation of said image for subsequent display, wherein said second correction circuit comprises;

first function means for performing three transformations on said second transformed signal, said first function means coupled to receive said second transformed signal, said first function means generating a first signal, a second signal and a third signal;

second function means for performing three transformations on said first transformed signal, said second function means coupled to receive said first transformed signal, said second function means generating a fourth signal, a fifth signal and a sixth signal;

third function means for performing three transformations on said third transformed signal, said third function means coupled to receive said third transformed signal, said third function means generating a seventh signal, an eight signal and a ninth signal;

first adder means for generating a first term signal equal to the arithmetic sum of said first signal, said fourth signal, and said seventh signal, said first adder means coupled to receive said first signal, said fourth signal, and said seventh signal;

second adder means for generating a second term signal equal to the arithmetic sum of said second signal, said fifth signal, and said eight signal, said second adder means coupled to receive said second signal, said fifth signal, and said eight signal;

third adder means for generating a third term signal equal to the arithmetic sum of said third signal, said sixth signal, and said ninth signal, said third adder means coupled to receive said third signal, said sixth signal, and said ninth signal;

fourth function means for transforming said first term signal, said fourth function means coupled to receive said first term signal, said fourth function means generating said fourth transformed signal;

fifth function means for transforming said second term signal, said fifth function means coupled to receive said second term signal, said fifth function means generating said fifth transformed signal;

sixth function means for transforming said third term signal, said sixth function means coupled to receive said third term signal, said sixth function means generating said sixth transformed signal.

3. A digitized image corrector for transforming a first digitized representation of an image into a second digitized representation of said image in accordance with a first transformation function defined by a first set of transform data, a second transformation function defined by a second set of transform data, a third transformation function defined by a third set of transform data, and a fourth transformation function defined by a fourth set of transform data, comprising:

first correction circuit for receiving said first set of transform data from a user and transforming said first digitized representation in accordance with said first transformation function, said first correction circuit having a first input means for receiving a first digitized signal, a second digitized signal, and a third digitized signal comprising said first digitized representation, said first correction circuit generating a first transformed signal, a second transformed signal, and a third transformed signal according to said first transformation function, said first correction circuit having a first output means for transmitting said first transformed signal, said second transformed signal, and said third transformed signal;

first bypass means for selectively bypassing said first correction circuit such that said first output means is coupled to transmit said first digitized signal, said second digitized signal, and said third digitized signal;

second correction circuit for receiving said second set of transform data from said user and transforming said first transformed signal, said second transformed signal, and said third transformed signal in accordance with said second transformation function, said second correction circuit having a second input means for receiving said first transformed signal, said second transformed signal, and said third transformed signal from said first output means, said second correction circuit generating a fourth transformed signal, a fifth transformed signal, and a sixth transformed signal according to said second transformation function, said second correction circuit having a second output means for transmitting said fourth transformed signal, said fifth transformed signal, and said sixth transformed signal;

second bypass means for selectively bypassing said second correction circuit such that said second output means is coupled to transmit said first transformed signal, said second transformed signal, and said third transformed signal;

third correction circuit for receiving said third set of transform data from said user and transforming said fourth transformed signal, said fifth transformed signal, and said sixth transformed signal in accordance with said third transformation function, said third correction circuit having a third input means for receiving said fourth transformed signal, said fifth transformed signal, and said sixth transformed signal from said fifth transformed signal, and said sixth transformed signal from said second output means, said third correction circuit generating a seventh transformed signal, an eight transformed signal, and a ninth transformed signal according to said third transformation function, said third correction circuit having a third output means for transmitting said seventh transformed signal, said eight transformed signal, and said ninth transformed signal;

third bypass means for selectively bypassing said third correction circuit such that said third output means is coupled to transmit said fourth transformed signal, said fifth transformed signal, and said sixth transformed signal;

fourth correction circuit for receiving said fourth set of transform data from said user and transforming said seventh transformed signal, said eight transformed signal, and said ninth transformed signal in accordance with said fourth transformation function, said fourth correction circuit having a fourth input means for receiving said seventh transformed signal, said eight transformed signal, and said ninth transformed signal from said third output means, said fourth correction circuit generating a tenth transformed signal, an eleventh transformed signal, and a twelfth transformed signal according to said fourth transformation function, said fourth correction circuit having a fourth output means for transmitting said tenth transformed signal, said eleventh transformed signal, and said twelfth transformed signal comprising said second digitized representation;

fourth bypass means for selectively bypassing said fourth correction circuit such that said fourth output means is coupled to transmit said seventh transformed signal, said eight transformed signal, and said ninth transformed signal;

image storage means for storing said second digitized representation of said image for subsequent display, wherein said third correction circuit comprises;

first function means for performing three transformations on said fifth transformed signal, said first function means coupled to receive said fifth transformed signal, said first function means generating a first signal, a second signal and a third signal;

second function means for performing three transformations on said fourth transformed signal, said second function means coupled to receive said fourth transformed signal, said second function means generating a fourth signal, a fifth signal and a sixth signal;

third function means for performing three transformations on said sixth transformed signal, said third function means coupled to receive said sixth transformed signal, said third function means generating a seventh signal, an eight signal and a ninth signal;

first adder means for generating a first term signal equal to the arithmetic sum of said first signal, said fourth signal, and said seventh signal, said first adder means coupled to receive said first signal, said fourth signal, and said seventh signal;

second adder means for generating a second term signal equal to the arithmetic sum of said second signal, said fifth signal, and said eight signal, said second adder means coupled to receive said second signal, said fifth signal, and said eight signal;

third adder means for generating a third term signal equal to the arithmetic sum of said third signal, said sixth signal, and said ninth signal, said third adder means coupled to receive said third signal, said sixth signal, and said ninth signal;

fourth function means for transforming said first term signal, said fourth function means coupled to receive said first term signal, said fourth function means generating said seventh transformed signal;

fifth function means for transforming said second term signal, said fifth function means coupled to receive said second term signal, said fifth function means generating said eighth transformed signal;

sixth function means for transforming said third term signal, said sixth function means coupled to receive said third term signal, said sixth function means generating said ninth transformed signal.

4. A digitized image corrector for transforming a first digitized representation of an image into a second digitized representation of said image in accordance with a first transformation function defined by a first set of transform data, a second transformation function defined by a second set of transform data, a third transformation function defined by a third set of transform data, and a fourth transformation function defined by a fourth set of transform data, comprising:

first correction circuit for receiving said first set of transform data from ser and transforming said first digitized representation in accordance with said first transformation function, said first correction circuit having a first input means for receiving a first digitized signal, a second digitized signal, and a third digitized signal comprising said first digitized representation, said first correction circuit generating a first transformed signal, a second transformed signal, and a third transformed signal according to said first transformation function, said first correction circuit having a first output means for transmitting said first transformed signal, said second transformed signal, and said third transformed signal;

first bypass means for selectively bypassing said first correction circuit such that said first output means is coupled to transmit said first digitized signal, said second digitized signal, and said third digitized signal;

second correction circuit for receiving said second set of transform data from said user and transforming said first transformed signal, said second transformed signal, and said third transformed signal in accordance with said second transformation function, said second correction circuit having a second input means for receiving said first transformed signal, said second transformed signal, and said third transformed signal from said first output means, said second correction circuit generating a fourth transformed signal, a fifth transformed signal, and a sixth transformed signal according to said second transformation function, said second correction circuit having a second output means for transmitting said fourth transformed signal, said fifth transformed signal, and said sixth transformed signal;

second bypass means for selectively bypassing said second correction circuit such that said second output means is coupled to transmit said first transformed signal, said second transformed signal, and said third transformed signal;

third correction circuit for receiving said third set of transform data from said user and transforming said fourth transformed signal, said fifth transformed signal, and said sixth transformed signal in accordance with said third transformation function, said third correction circuit having a third input means for receiving said fourth transformed signal, said fifth transformed signal, and said sixth transformed signal from said second output means, said third correction circuit generating a seventh transformed signal, an eight transformed signal, and a ninth transformed signal according to said third transformation function, said third correction circuit having a third output means for transmitting said seventh transformed signal, said eight transformed signal, and said ninth transformed signal;

third bypass means for selectively bypassing said third correction circuit such that said third output means is coupled to transmit said fourth transformed signal, said fifth transformed signal, and said sixth transformed signal;

fourth correction circuit for receiving said fourth set of transform data from said user and transforming said seventh transformed signal, said eight transformed signal, and said ninth transformed signal in accordance with said fourth transformation function, said fourth correction circuit having a fourth input means for receiving said seventh transformed signal, said eight transformed signal, and said ninth transformed signal from said third output means, said fourth correction circuit generating a tenth transformed signal, an eleventh transformed signal, and a twelfth transformed signal according to said fourth transformation function, said fourth correction circuit having a fourth output means for transmitting said tenth transformed signal, said eleventh transformed signal, and said twelfth transformed signal comprising said second digitized representation;

fourth bypass means for selectively bypassing said fourth correction circuit such that said fourth output means is coupled to transmit said seventh transformed signal, said eight transformed signal, and said ninth transformed signal;

image storage means for storing said second digitized representation of said image for subsequent display, wherein said fourth correction circuit comprises;

first function means for performing three transformations on said eight transformed signal, said first function means coupled to receive said eight transformed signal, said first function means generating a first signal, a second signal and a third signal;

second function means for performing three transformations on said seventh transformed signal, said second function means coupled to receive said seventh transformed signal, said second function means generating a fourth signal, a fifth signal and a sixth signal;

third function means for performing three transformations on said ninth transformed signal, said third function means coupled to receive said ninth transformed signal, said third function means generating a seventh signal, an eight signal and a ninth signal;

first adder means for generating a first term signal equal to the arithmetic sum of said first signal, said fourth signal, and said seventh signal, said first adder means coupled to receive said first signal, said fourth signal, and said seventh signal;

second adder means for generating a second term signal equal to the arithmetic sum of said second signal, said fifth signal, and said eight signal, said second adder means coupled to receive said second signal, said fifth signal, and said eight signal;

third adder means for generating a third term signal equal to the arithmetic sum of said third signal, said sixth signal, and said ninth signal, said third adder means coupled to receive said third signal, said sixth signal, and said ninth signal;

fourth function means for transforming said first term signal, said fourth function means coupled to receive said first term signal, said fourth function means generating said tenth transformed signal;

fifth function means for transforming said second term signal, said fifth function means coupled to receive said second term signal, said fifth function means generating said eleventh transformed signal;

sixth function means for transforming said third term signal, said sixth function means coupled to receive said third term signal, said sixth function means generating said twelfth transformed signal.

5. A digitized image corrector, comprising:

a pair of film corrector circuits for transforming a digitized representation of a film image into a film corrected representation in accordance with a plurality of film transformation functions, each film transformation function defined by a plurality of sets of film transform data supplied by a user, each film corrector circuit having a film data input means for receiving the digitized representation of the film image and a film data output means for transferring the film corrected representation;

film bypass means for selectively bypassing the film corrector circuits according to a bypass control from the user, the film bypass means causing the film corrector circuits to enter a film bypass mode by coupling the film data input means to the film data output means, such that the film corrected representation equals the digitized representation of the film image, the bypass control causing one of the film corrector circuits to enter a film live mode, and causing one of the film corrector circuits to enter the film bypass mode, such that the film corrector circuit in the film bypass mode receives new transform data from the user;

a pair of video corrector circuits for transforming the film corrected representation into a video corrected representation in accordance with a plurality of video transformation functions, each video transformation function defined by a plurality of sets of video transform data supplied by the user, each video corrector circuit having a video data input means for receiving the film corrected representation and a video data output means for transferring the video corrected representation;

video bypass means for selectively bypassing the video corrector circuits according to the bypass control from the user, the video bypass means causing the video corrector circuits to enter a video bypass mode by coupling the video data input means to the video data output means, such that the video corrected representation equals the film corrected representation, the bypass control causing one of the video corrector circuits to enter a video live mode, and causing one of the video corrector circuits to enter the video bypass mode, such that video corrector circuit in the video bypass mode receives new transform data from the user;

image storage means for storing the video corrected representation for subsequent display.

6. The digitized image corrector of claim 5, wherein the digitized representation of the film image comprises a first digitized signal, a second digitized signal, and a third digitized signal, and wherein the film corrected representation comprises a first transformed signal, a second transformed signal, and a third transformed signal.

7. The digitized image corrector of claim 6, wherein each film corrector circuit comprises:

first function means for performing three transformations on the second digitized signal in accordance with the film transformation functions, the first function means coupled to receive the second digitized signal, the first function means generating a first signal, a second signal and a third signal;

second function means for performing three transformations on the first digitized signal in accordance with the film transformation functions, the second function means coupled to receive the first digitized signal, the second function means generating a fourth signal, a fifth signal and a sixth signal;

third function means for performing three transformations on the third digitized signal in accordance with the film transformation functions, the third function means coupled to receive the third digitized signal, the third function means generating a seventh signal, an eight signal and a ninth signal;

first adder means for generating a first term signal equal to the arithmetic sum of the first signal, the fourth signal, and the seventh signal, the first adder means coupled to receive the first signal, the fourth signal, and the seventh signal;

second adder means for generating a second term signal equal to the arithmetic sum of the second signal, the fifth signal, and the eight signal, the second adder means coupled to receive the second signal, the fifth signal, and the eight signal;

third adder means for generating a third term signal equal to the arithmetic sum of the third signal, the sixth signal, and the ninth signal, the third adder means coupled to receive the third signal, the sixth signal, and the ninth signal;

fourth function means for transforming the first term signal in accordance with the film transformation functions, the fourth function means coupled to receive the first term signal, the fourth function means generating the first transformed signal;

fifth function means for transforming the second term signal in accordance with the film transformation functions, the fifth function means coupled to receive the second term signal, the fifth function means generating the second transformed signal;

sixth function means for transforming the third term signal in accordance with the film transformation functions, the sixth function means coupled to receive the third term signal, the sixth function means generating the third transformed signal.

8. The digitized image corrector of claim 7, wherein the image storage means comprises frame buffer memory means.

9. The digitized image corrector of claim 7, wherein the image storage means comprises video tape storage means.

10. The digitized image corrector of claim 7, wherein the image storage means comprises laser disc storage means.

11. A digitized image corrector, comprising:

at least one film corrector circuit for transforming a digitized representation of a film image into a film corrected representation in accordance with a plurality of film transformation functions, each film transformation function defined by a plurality of sets of film transform data supplied by a user, each film corrector circuit having a film data input means for receiving the digitized representation of the film image and a film data output means for transferring the film corrected representation;

film bypass means for selectively bypassing the film corrector circuit according to a bypass control from the user, the film bypass means causing the film corrector circuit to enter a film bypass mode by coupling the film data input means to the film data output means, such that the film corrected representation equals the digitized representation of the film image;

at least one video corrector circuit for transforming the film corrected representation into a video corrected representation in accordance with a plurality of video transformation functions, each video transformation function defined by a plurality of sets of video transform data supplied by the user, each video corrector circuit having a video data input means for receiving the film corrected representation and a video data output means for transferring the video corrected representation;

video bypass means for selectively bypassing each video corrector circuit according to the bypass control from the user, the video bypass means causing one of the video corrector circuits to enter a video bypass mode by coupling the video data input means to the video data output means, such that the video corrected representation equals the film corrected representation;

image storage means for storing the video corrected representation for subsequent display, wherein the film corrected representation comprises a first digitized signal, a second digitized signal, and a third digitized signal, and wherein the video corrected representation comprises a first transformed signal, a second transformed signal, and a third transformed signal, and wherein each video corrector circuit comprises:

first function means for performing three transformations on each second digitized signal in accordance with the video transformation functions, the first function means coupled to receive the second digitized signal, the first function means generating a first signal, a second signal and a third signal;

second function means for performing three transformations on the first digitized signal in accordance with the video transformation functions, the second function means coupled to receive the first digitized signal, the second function means generating a fourth signal, a fifth signal and a sixth signal;

third function means for performing three transformations on the third digitized signal in accordance with the video transformation functions, the third function means coupled to receive the third digitized signal, the third function means generating a seventh signal, an eight signal and a ninth signal;

first adder means for generating a first term signal equal to the arithmetic sum of the first signal, the fourth signal, and the seventh signal, the first adder means coupled to receive the first signal, the fourth signal, and the seventh signal;

second adder means for generating a second term signal equal to the arithmetic sum of the second signal, the fifth signal, and the eight signal, the second adder means coupled to receive the second signal, the fifth signal, and the eight signal;

third adder means for generating a third term signal equal to the arithmetic sum of the third signal, the sixth signal, and the ninth signal, the third adder means coupled to receive the third signal, the sixth signal, and the ninth signal;

fourth function means for transforming the first term signal in accordance with the video transformation functions, the fourth function means coupled to receive the first term signal, the fourth function means generating the first transformed signal;

fifth function means for transforming the second term signal in accordance with the video transformation functions, the fifth function means coupled to receive the second term signal, the fifth function means generating the second transformed signal;

sixth function means for transforming the third term signal in accordance with the video transformation functions, the sixth function means coupled to receive the third term signal, the sixth function means generating the third transformed signal.

12. The digitized image corrector of claim 11, wherein the image storage means comprises frame buffer memory means.

13. The digitized image corrector of claim 11, wherein the image storage means comprises video tape storage means.

14. The digitized image corrector of claim 11, wherein the image storage means comprises laser disc storage means.

* * * * *